United States Patent
Li et al.

(10) Patent No.: US 11,736,220 B2
(45) Date of Patent: Aug. 22, 2023

(54) METHOD AND APPARATUS FOR DETERMINING MCS LEVEL, AND STORAGE MEDIUM

(71) Applicant: BEIJING XIAOMI MOBILE SOFTWARE CO., LTD., Beijing (CN)

(72) Inventors: Yuanyuan Li, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 435 days.

(21) Appl. No.: 17/258,570

(22) PCT Filed: Jul. 20, 2018

(86) PCT No.: PCT/CN2018/096492
§ 371 (c)(1),
(2) Date: Jan. 7, 2021

(87) PCT Pub. No.: WO2020/014973
PCT Pub. Date: Jan. 23, 2020

(65) Prior Publication Data
US 2021/0242960 A1    Aug. 5, 2021

(51) Int. Cl.
*H04W 24/10* (2009.01)
*H04L 1/00* (2006.01)
(Continued)

(52) U.S. Cl.
CPC .......... *H04L 1/0003* (2013.01); *H04L 1/0026* (2013.01); *H04L 5/0057* (2013.01);
(Continued)

(58) Field of Classification Search
CPC ... H04L 1/0003; H04L 1/0026; H04L 5/0057; H04W 4/40; H04W 24/02; H04W 24/10;
(Continued)

(56) References Cited

U.S. PATENT DOCUMENTS

2018/0124771 A1* 5/2018 Mok ............... H04W 72/51
2021/0266132 A1* 8/2021 Falconetti ......... H04L 5/0044

FOREIGN PATENT DOCUMENTS

CN   102573076 A     7/2012
CN   107995605   * 10/2016  .............. H04W 4/70
(Continued)

OTHER PUBLICATIONS

International Search Report dated Apr. 18, 2019 in PCT/CN2018/096492 filed on Jul. 20, 2018, 2 pages.

*Primary Examiner* — Christopher R Crompton
(74) *Attorney, Agent, or Firm* — Oblon, McClelland, Maier & Neustadt, L.L.P.

(57) ABSTRACT

A method for determining MCS level is provided. The method can include obtaining by a first terminal, at least one piece of measurement information which includes a measurement position indicating a time-frequency position occupied by information sent via a direct communication interface for transmitting V2X businesses of the Internet of Vehicles, and a measurement value indicating channel quality of a channel for transmitting the information. The method can include obtaining by the first terminal, a target measurement value corresponding to a target measurement position from the at least one piece of measurement information, determining by the first terminal, a quality parameter of a target channel for transmitting the target information according to the target measurement value, and determining by the first terminal, a maximum available MCS level corresponding to the target channel according to the quality parameter of the target channel.

20 Claims, 5 Drawing Sheets

(51) Int. Cl.
*H04W 4/40* (2018.01)
*H04L 5/00* (2006.01)
*H04W 24/02* (2009.01)
*H04W 64/00* (2009.01)
*H04W 72/02* (2009.01)
*H04W 72/0453* (2023.01)

(52) U.S. Cl.
CPC ............. *H04W 4/40* (2018.02); *H04W 24/02* (2013.01); *H04W 24/10* (2013.01); *H04W 64/003* (2013.01); *H04W 72/02* (2013.01); *H04W 72/0453* (2013.01)

(58) Field of Classification Search
CPC ............... H04W 64/003; H04W 72/02; H04W 72/0453
USPC ......................................................... 370/329
See application file for complete search history.

(56) References Cited

FOREIGN PATENT DOCUMENTS

| CN | 107223317 A | 9/2017 | |
|----|---|---|---|
| CN | 107995605 A | 5/2018 | |
| WO | WO 2012/092815 A1 | 7/2012 | |
| WO | WO 2016/208836 * | 1/2016 | ............ H04W 88/08 |

* cited by examiner

METHOD AND APPARATUS FOR DETERMINING MCS LEVEL, AND STORAGE MEDIUM

CROSS-REFERENCE TO RELATED APPLICATION

This application is a U.S. national phase application of International Application No. PCT/CN2018/096492, filed on Jul. 20, 2018, the entire contents of which are incorporated herein by reference.

TECHNICAL FIELD

Embodiments of the present disclosure relate to a field of communication technology, including to a method and an apparatus for determining an MCS (Modulation and Coding Scheme) level, and a storage medium.

BACKGROUND

V2X (Vehicle to Everything, Internet of Vehicles) technology, also known as wireless communication technology for vehicles, is a new generation of information communication technology that connects a vehicle with everything. The direct communication interface between terminals involved in the V2X technology is a PC5 interface.

Currently, the following method is configured to determine the MCS level of physical channels for sending the information transmitted via the direct communication interface in the V2X technology. The terminal determines the MCS level according to the amount of data to be sent.

SUMMARY

Exemplary embodiments of the present disclosure provide a method and an apparatus for determining an MCS level, and a storage medium. The technical solutions are described as follows.

According to embodiments of the present disclosure, a method for determining an MCS level is provided. The method can include obtaining by a first terminal, at least one piece of measurement information which includes a measurement position indicating a time-frequency position occupied by information sent via a direct communication interface for transmitting V2X businesses, and a measurement value indicating channel quality of a channel for transmitting the information. The method can further include obtaining by the first terminal, a target measurement value corresponding to a target measurement position from the at least one piece of measurement information, wherein the target measurement position refers to a measurement position corresponding to target information sent by the first terminal. Additionally, the method can include determining by the first terminal, a quality parameter of a target channel for transmitting the target information according to the target measurement value, and determining by the first terminal, a maximum available MCS level corresponding to the target channel according to the quality parameter of the target channel.

According to embodiments of the present disclosure, an apparatus for determining a MCS level which is applied to a first terminal is provided. The apparatus can include one or more processors and a memory storing instructions executable by the one or more processors. The one or more processors are configured to obtain at least one piece of measurement information which includes a measurement position indicating a time-frequency position occupied by information sent via a direct communication interface for transmitting V2X businesses, and a measurement value indicating channel quality of a channel for transmitting the information. The one or more processors can further obtain a target measurement value corresponding to a target measurement position from the at least one piece of measurement information, wherein the target measurement position refers to a measurement position corresponding to target information sent by the first terminal; determine a quality parameter of a target channel for transmitting the target information according to the target measurement value, and determine a maximum available MCS level corresponding to the target channel according to the quality parameter of the target channel.

According to embodiments of the present disclosure, a non-transitory computer-readable storage medium having a computer program stored thereon is provided. When the computer program is executed by a processor, the processor is caused to execute a method for determining a Modulation and Coding Scheme (MCS) level. The method may include obtaining by a first terminal, at least one piece of measurement information which includes a measurement position indicating a time-frequency position occupied by information sent via a direct communication interface for transmitting V2X businesses of the Internet of Vehicles, and a measurement value indicating channel quality of a channel for transmitting the information. The method can further include obtaining by the first terminal, a target measurement value corresponding to a target measurement position from the at least one piece of measurement information, wherein the target measurement position refers to a measurement position corresponding to target information sent by the first terminal, determining by the first terminal, a quality parameter of a target channel for transmitting the target information according to the target measurement value, and determining by the first terminal, a maximum available MCS level corresponding to the target channel according to the quality parameter of the target channel.

It should be understood that, the above general descriptions and the detailed descriptions hereafter are only exemplary and explanatory and do not constitute limitations to the present disclosure.

BRIEF DESCRIPTION OF THE DRAWINGS

The drawings herein are incorporated into the specification and constitute a part of the specification, show embodiments in conformity with the present disclosure and explain the principle of the present disclosure together with the specification.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present disclosure. Rather, they are only examples of the apparatus and method consistent with some aspects of the present disclosure as detailed in the appended claims.

The network architecture and business scenarios described in the embodiments of the present disclosure are intended to more clearly illustrate the technical solutions of the embodiments of the present disclosure, and do not constitute a limitation to the technical solutions provided by the embodiments of the present disclosure. It is known for those skilled in the art that the technical solutions provided by the embodiments of the present disclosure are also applied to similar technical problems with the evolution of network architecture and the emergence of new business scenarios.

Figure 1:
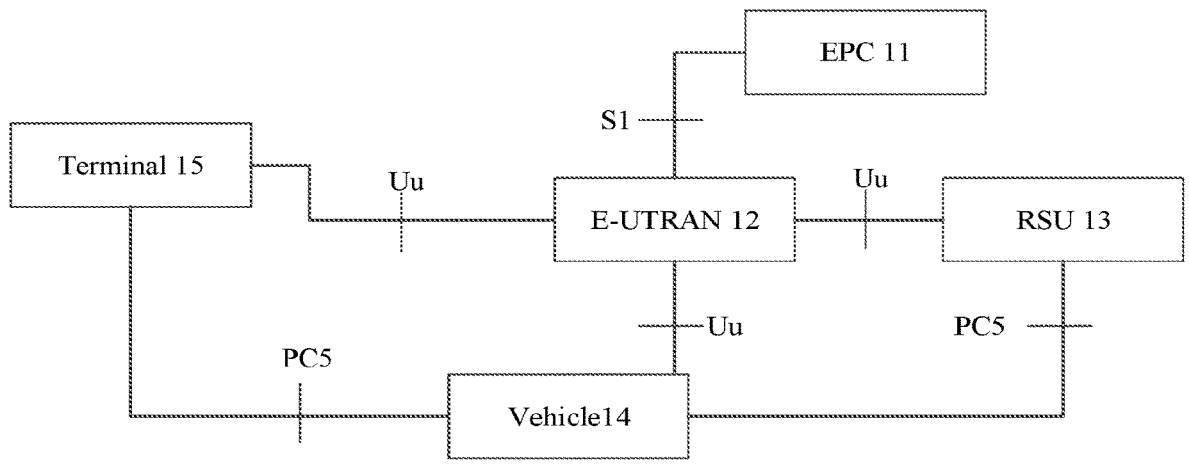
FIG. 1 illustrates a schematic diagram of a network architecture to which embodiments of the present disclosure may be applicable.

FIG. 1 illustrates a schematic diagram of a network architecture to which embodiments of the present disclosure may be applicable. The network architecture only takes a LTE (Long Term Evolution) system as an example. The network architecture may include an EPC (Evolved Packet Core) 11, an E-UTRAN (Evolved UMTS Terrestrial Radio Access Network) 12, a RSU (Road Side Unit) 13, a vehicle 14 and a terminal 15.

The EPC 11 is a core network of the LTE system which includes several core network devices. The functions of the core network equipment are mainly to provide user connections, manage users, and complete the bearing of businesses (i.e., as a bearing network to provide an interface to the external network). For example, EPC 11 includes an MME (Mobility Management Entity), an S-GW (Serving Gateway), and a P-GW (PDN Gateway).

The E-UTRAN 12 is an access network of the LTE system. The access network includes several access network devices. The access network device may be a base station, which is an apparatus deployed in the access network to provide the terminal 15 with a function of wireless communication. The base station may include various forms of macro base stations, micro base stations, relay stations, access points, and so on. In systems using different wireless access technologies, the names of devices with a function of base station may be different. For example, they are called evolved NodeBs (eNBs or eNodeBs) in the LTE system while Node B in 3G communication systems.

The terminal 15 may include various handheld devices, on-board devices, wearable devices, computing devices or other processing devices connected to wireless modems with a function of wireless communication, as well as various forms of user equipment (UE), mobile stations (MS), terminal devices, and the like. For ease of description, the devices mentioned above are collectively referred to as terminals.

The access network device and the core network device communicate with each other through a certain air interface technology, such as an Si interface. The access network device and the terminal 15 also communicate with each other through a certain air interface technology, such as a Uu interface.

The RSU 13 may include a microwave reading and writing device and a controller. The RSU 13 is configured to receive the information reported by the vehicle 14 and deliver road traffic information to the vehicle 14. The RSU 13 has data storage and processing capabilities, may quickly and accurately detect traffic information, such as road conditions and driving, and process the traffic information before sending to the vehicle 14. The RSU 13 and the access network device may communicate with each other through a certain air interface technology, such as a Uu interface.

The vehicle 14 may be an autonomous driving vehicle or a non-autonomous driving vehicle. The vehicle 14 is equipped with an on-board communication apparatus via which the vehicle 14 communicates with other vehicles, the terminal 15 or other devices, such as the RSU 13. The on-board communication apparatus may be one integrated in an on-board communication box, such as a Telematics BOX (T-BOX) or may be one separated from the vehicle body. In addition, the on-board communication apparatus may be installed in the vehicle 14 before/after the vehicle 14 leaves the factory. The on-board communication apparatus of the vehicle 14 and the terminal 15 may communicate with each other through a direct communication interface, such as a PC5 interface. For example, the terminal 15 sends its own location information to the vehicle 14 through the PC5 interface. The on-board communication apparatus of the vehicle 14 and the RSU 13 may communicate with each other through a direct communication interface, such as a PC5 interface. For example, the RSU 13 sends the traffic information for a distant road to the vehicle 14 through the PC5 interface. In addition, the on-board communication apparatus of the vehicle 14 and the access network device, such as the eNB of the LTE system, may also communicate with each other through a certain air interface technology, such as a Uu interface.

V2X business scenarios may be implemented by the above network architecture shown in FIG. 1. The above network architecture may also include devices such as V2X application servers, V2X control function nodes, etc., which are not limited in the embodiments of the present disclosure.

It should be noted that, only the LTE system is taken as an example for description in the network architecture shown in FIG. 1. The technical solutions described in this disclosure may be applied to the LTE system, or any other wireless communication systems that use various wireless access technologies such as a Code Division A plurality ofAccess (CDMA), a Frequency Division A plurality ofAccess (FDMA), a Time Division A plurality ofAccess (TDMA), an Orthogonal Frequency Division A plurality ofAccess (OFDMA), a Single Carrier Frequency Division A plurality ofAccess (SC-FDMA). In addition, it may also be applied to any subsequent evolution systems of the LTE system, such as the next-generation network system, i.e., the 5th Generation (5G) system. In addition, the terms "network" and "system" in the embodiments of the present disclosure are often used interchangeably, but those skilled in the art may understand their meaning.

Figure 2:
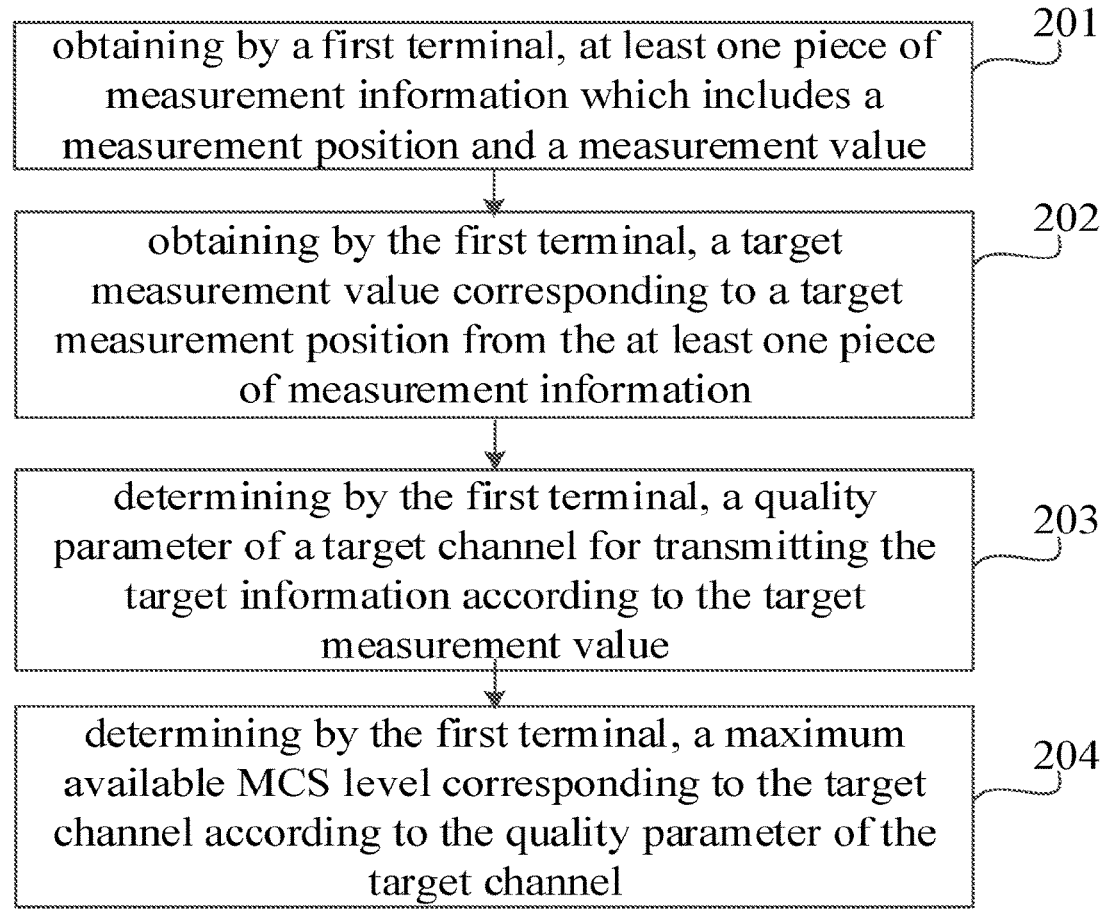
FIG. 2 is a flowchart illustrating a method for determining an MCS level according to an example embodiment.

FIG. 2 is a flowchart illustrating a method for determining an MCS level according to an example embodiment. This method may be applied to the network architecture shown in FIG. 1. The method may include the following steps.

At step 201, the first terminal obtains at least one piece of measurement information, and the measurement information includes a measurement position and a measurement value. The first terminal refers to a terminal device that communicates with at least one other device via a direct communication interface in a V2X business scenario. For example, the first terminal may be an on-board communication apparatus of the vehicle 14 in the network architecture described in the embodiment in FIG. 1, or terminal 15 in the network architecture described in the embodiment in FIG. 1, or RSU 13 in the network architecture described in the embodiment in FIG. 1, or other network devices capable of communicating via the direct communication interface in the V2X business scenario, which are not limited in the embodiment of the present disclosure. Alternatively, the above direct communication interface is a PC5 interface.

In the embodiments of the present disclosure, a measurement position is configured to indicate a time-frequency position occupied by information sent via the direct communication interface for transmitting V2X businesses, and a measurement value is configured to indicate channel quality of a channel for transmitting the above information.

The measurement position is configured to indicate time domain position and/or frequency domain position occupied by the information sent via the direct communication interface for transmitting the V2X businesses. Alternatively, the measurement position includes but is not limited to at least one of the following: a frame identifier, a sub-frame identifier, a slot identifier, a symbol identifier, a subcarrier identifier, a RB (Resource Block) identifier, a RE (Resource Element). The frame identifier is configured to indicate a position of frame occupied by the above information, the sub-frame identifier is configured to indicate a position of sub-frame occupied by the above information, the time slot identifier is configured to indicate a position of time slot occupied by the above information, the symbol identifier is configured to indicate a position of symbol occupied by the above information, the subcarrier identifier is configured to indicate a position of subcarrier occupied by the above information, the RB identifier is configured to indicate a position of RB occupied by the above information, and the RE identifier is configured to indicate a position of RE occupied by the above information. The parameters carried in the measurement position may be pre-defined in the protocol.

The measurement value is configured to indicate channel quality of a physical channel for transmitting the above information. The measurement values include but are not limited to at least one of the following: a CQI (Channel Quality Indicator), an RI (rank indication), a PMI (Precoding Matrix Indicator), an RSRP (Reference Signal Receiving Power). The parameters carried in the measured value may be pre-defined in the protocol.

Each measurement information includes a set of corresponding measurement positions and measurement values. The measurement value records the time-frequency position occupied by the measured information when it is sent and the channel quality of the physical channel used by the above measured information when it is sent. The at least one piece of measurement information obtained by the first terminal may include measurement information recorded after measurement value collection is performed on the information sent by the first terminal, and may also include measurement information recorded after measurement value collection is performed on the information sent by other terminals except for the first terminal.

Alternatively, the first terminal receives the above at least one piece of measurement information from at least one other terminal. Exemplarily, the first terminal receives a message carrying measurement information sent by the second terminal, and the first terminal obtains the measurement information from the above message. The second terminal refers to a terminal device that communicates with the first terminal via a direct communication interface in a V2X business scenario. Similarly, the second terminal may be the on-board communication apparatus, the terminal 15, the RSU 13, or other network devices of the vehicle 14 in the network architecture described in the embodiment of FIG. 1, which is not limited in the embodiment of the present disclosure. The second terminal may directly send the above message carrying measurement information to the first terminal, or may forward the above message carrying measurement information to the first terminal through other devices, such as an access network device or other terminals. In addition, the above message sent by the second terminal may carry one or more piece of measurement information, which is not limited in the embodiment of the present disclosure.

Exemplarily, the first terminal obtains a plurality of measurement information, which may be as follows in the Table 1:

TABLE 1

| measurement position 1 | measurement value 1 |
| measurement position 2 | measurement value 2 |
| measurement position 3 | measurement value 3 |
| measurement position 4 | measurement value 4 |
| . . . | . . . |

At step 202, the first terminal obtains a target measurement value corresponding to a target measurement position from the at least one piece of measurement information. The target measurement position refers to a measurement position corresponding to target information sent by the first terminal. The target information refers to information sent by the first terminal via a direct communication interface for transmitting V2X businesses. The target information may be a control signaling, business data, or any other information sent by the first terminal via the above direct communication interface, which is not limited in the embodiment of the present disclosure. In addition, the manner in which the first terminal sends the target information is also not limited in the embodiments of the present disclosure, i.e., the target information may be sent in a broadcast manner or in a point-to-point manner.

The first terminal may record time-frequency position (i.e., target information position) occupied by the target information that is sent by the first terminal. After obtaining at least one piece of measurement information, the first terminal obtains a target measurement value corresponding to the target measurement position from the at least one piece of measurement information. For example, assuming that the recorded time-frequency position occupied by the target information that is sent by the first terminal is the same as the measurement position 2, the target measurement value obtained by the first terminal includes the measurement value 2 in conjunction with the above Table 1.

In addition, since the target information sent by the first terminal may be received by one or more other terminals and each terminal that receives the target information may feed measurement information back to the first terminal, so a number of target measurement values obtained by the first terminal may be one or more.

At step 203, the first terminal determines a quality parameter of a target channel for transmitting the target information according to the target measurement value. The quality parameter of the target channel is configured to indicate channel quality of the target channel. After obtaining the target measurement value, the first terminal converts the target measurement value into an equivalent quality parameter under a channel of AWGN (Additive White Gaussian Noise). Alternatively, the quality parameter is an SNR or an SINR.

In an example, in case that the first terminal obtains a target measurement value, the first terminal determines the quality parameter of the target channel for transmitting the target information according to the target measurement value.

In another example, in case that the first terminal obtains at least two target measurement values, the first terminal determines an integrated measurement value according to the at least two target measurement values, and then determines the quality parameter of the target channel for transmitting the target information according to the integrated measurement value. The integrated measurement value represents an overall level of the at least two target measurement values.

In a possible implementation, the first terminal determines a threshold value that meets a preset condition as an integrated measurement value according to the at least two target measurement values. The preset condition is that there are p % of target measurement values greater than the threshold value and there are 1-p % of target measurement values less than the threshold value, where p is a preset constant, for example, p is 90, 80, or 70, which is not limited in the embodiment of the present disclosure. In addition, the value of p may be pre-defined in the protocol, or determined by the first terminal itself, or notified by other devices to the first terminal, which is not limited in the embodiment of the present disclosure. In addition, when there are a plurality of threshold values that meet the above preset condition, the first terminal may determine an average value of the plurality of threshold values as the integrated measurement value.

In another possible implementation, the first terminal calculates an average value of the at least two target measurement values and determines the average value as the integrated measurement value.

Of course, the two methods for determining the integrated measurement value are only exemplarily introduced above, while the embodiment of the present disclosure does not limit that other methods may be used to determine the integrated measurement value. For example, a median of the at least two target measurement values above is selected as the integrated measurement value, or an average value of the maximum value and the minimum value of the at least two target measurement values is determined as the integrated measurement value, and so on.

The first terminal may convert the measurement values (such as the target measurement value in the first example above, or the integrated measurement value in the second example above) into target quality parameters with an EESM (Exponential Effective SIR Mapping) algorithm, which is not described in detail in the embodiment of the present disclosure.

At step 204, the first terminal determines a maximum available MCS level corresponding to the target channel according to the quality parameter of the target channel. For each of different MCS levels, a corresponding relationship between a set of quality parameters (SNR or SINR) and BLER (block error rate) may be preset. The BLER refers to the percentage of wrong blocks in all the transmitted blocks. The above corresponding relationship may be obtained through simulation. The first terminal may pre-store the corresponding relationship under each MCS level described above. After obtaining the quality parameter of the target channel, the first terminal determines the maximum available MCS level corresponding to the target channel according to the pre-stored corresponding relationship under each MCS level.

The maximum available MCS level corresponding to the target channel refers to a maximum value of the MCS level that may be used when transmitting information on the target channel.

In summary, with the technical solution according to the embodiments of the present disclosure, the first terminal obtains a target measurement value corresponding to a target measurement position from the measurement information, the target measurement position referring to a measurement position corresponding to target information sent by the first terminal; the first terminal determines a quality parameter of a target channel for transmitting the target information according to the target measurement value, and further determines a maximum available MCS level corresponding to the target channel according to the quality parameter of the target channel. It is achieved that an MCS level is determined after evaluating the channel quality, which avoids the problem that large-scale information loss is caused by the selected MCS level being too large when the channel quality is poor and helps improve the reliability of information transmission.

Figure 3:
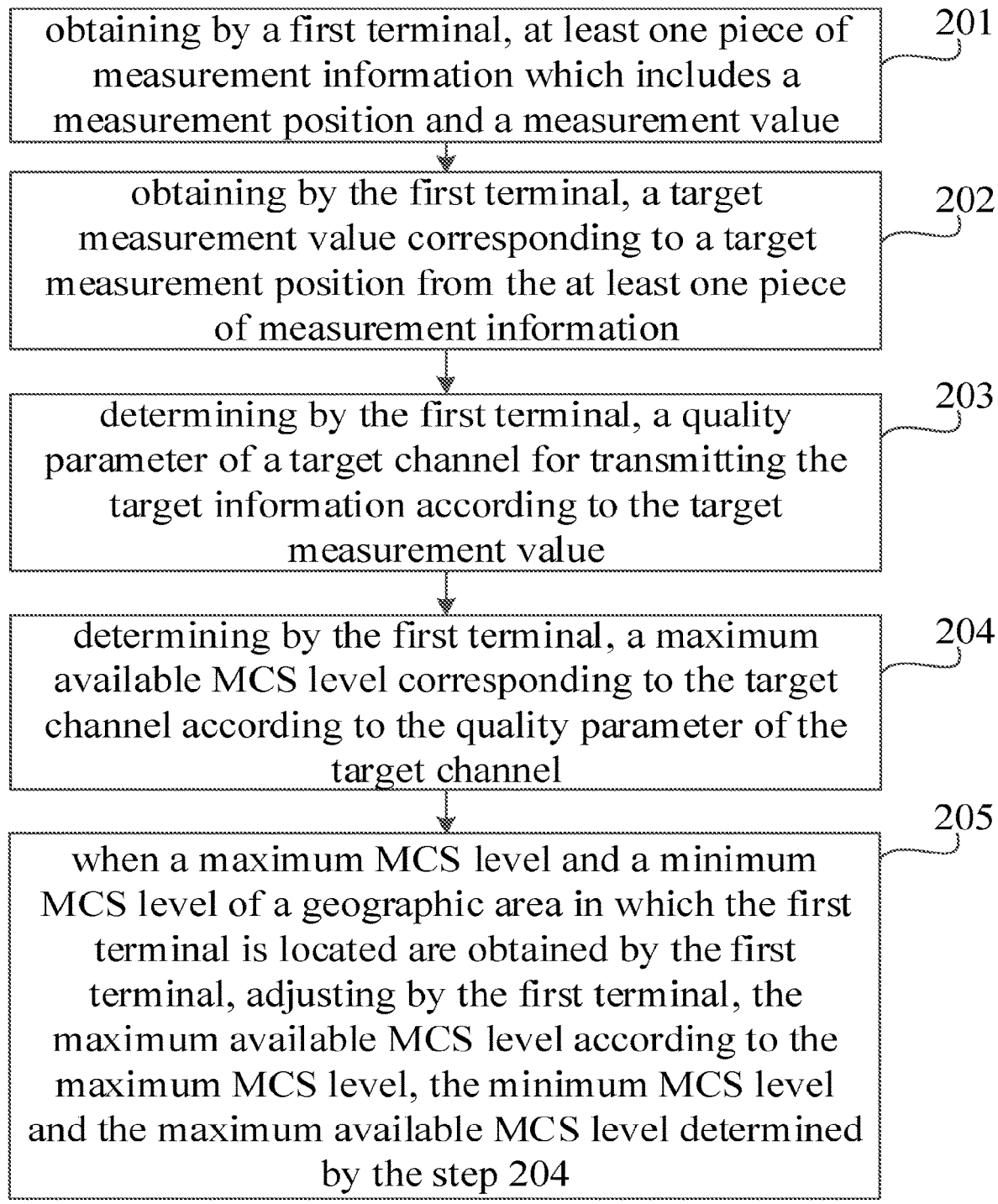
FIG. 3 is a flowchart illustrating a method for determining an MCS level according to another example embodiment.

In an alternative embodiment based on the embodiment in FIG. 2, as shown in FIG. 3, after the above step 204, the method may further include the following steps:

At step 205, when a maximum MCS level and a minimum MCS level of a geographic area in which the first terminal is located are obtained by the first terminal, adjusting by the first terminal, the maximum available MCS level according to the maximum MCS level, the minimum MCS level and the maximum available MCS level determined by the step 204.

The manner in which the first terminal obtains the maximum MCS level and the minimum MCS level of the geographic area where the first terminal is located is not limited in the embodiment of the present disclosure. For example, the first terminal may receive notification information sent from the access network device, the notification information carrying the maximum MCS level and the minimum MCS level of the geographic area where the first terminal is located. The first terminal obtains the maximum MCS level and the minimum MCS level from the above notification information. For another example, the storage device of the first terminal may pre-store the maximum MCS level and the minimum MCS level of the geographic area where the first terminal is located, and the first terminal obtains the maximum MCS level and the minimum MCS level from the above storage device.

When the maximum available MCS level before adjustment is greater than the minimum MCS level, determining by the first terminal, the smaller between the maximum available MCS level before adjustment and the maximum MCS level as the adjusted maximum available MCS level; when the maximum available MCS level before adjustment is less than or equal to the minimum MCS level, determining by the first terminal, the minimum MCS level as the adjusted maximum available MCS level.

Assuming that the maximum available MCS level before adjustment is $MCS_X$, the maximum MCS level of the geographic area where the first terminal is located is $MCS_x$, and the minimum MCS level is $MCS_{min}$, then:

when $MCS_X>MCS_{min}$, the maximum available MCS level of the first terminal on the target channel is min ($MCS_{max}$, $MCS_X$), and the minimum available MCS level is $MCS_{min}$; where min ($MCS_{max}$, $MCS_X$) represents a smaller value of $MCS_{max}$ and $MCS_X$; and when $MCS_X \leq MCS_{min}$, the available MCS level of the first terminal on the target channel is $MCS_{min}$.

In addition, when the first terminal does not obtain the maximum MCS level and the minimum MCS level of the geographic area where the first terminal is located, the first terminal does not need to adjust the maximum available MCS level determined at step 204.

In summary, with the technical solution according to the embodiments of the present disclosure, the first terminal adjusts the maximum available MCS level determined at step 204 according to the maximum MCS level and the minimum MCS level of the geographic area where the first terminal is located, which ensures the finally determined MCS level conforms to the restricted condition for the geographic area where the first terminal is located.

Figure 4:
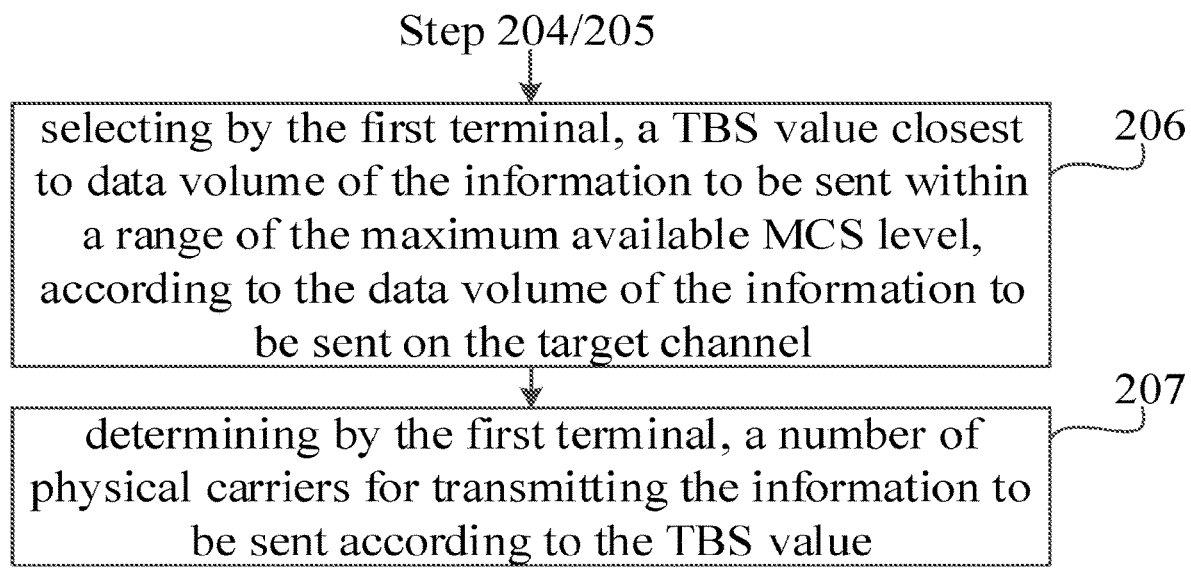
FIG. 4 is a flowchart illustrating a method for determining an MCS level according to another example embodiment.

In another alternative embodiment based on the embodiment in FIG. 2 or the alternative embodiment in FIG. 3, as shown in FIG. 4, after the above step 204 or step 205, the method may further include the following steps:

At step 206, the first terminal selects a TBS value closest to data volume of the information to be sent within a range of the maximum available MCS level according to the data volume of the information to be sent on the target channel. Alternatively, the TBS value closest to the data volume of the information to be sent is: the smallest value among the candidate TBS values that are not less than the data volume of the information to be sent.

At step 207, the first terminal determines a number of physical carriers for transmitting the information to be sent according to the TBS value. Alternatively, the first terminal determines the number of physical carriers for transmitting the information to be sent, and any of the following ways may be adopted:

1. the first terminal selects the largest number of physical carriers from at least two candidate numbers of physical carriers as the number of physical carriers for transmitting the information to be sent. In this way, the code rate may be reduced and the transmission reliability may be improved with a great extent.

2. the first terminal selects the smallest number of physical carriers from at least two candidate numbers of physical carriers as the number of physical carriers for transmitting the information to be sent. In this way, the occupation of physical resources may be reduced and the network are allowed to accommodate more users.

In addition, the at least two candidate numbers of physical carriers may be determined by the first terminal according to the TBS value. In other possible embodiments, the first terminal may also select other numbers other than the largest and smallest numbers of physical carriers from the at least two candidate numbers of physical carriers as the number of physical carriers for transmitting the information to be sent. For example, an intermediate value is selected as the number of physical carriers for transmitting the information to be sent to achieve a compromise selection scheme.

Hereafter, the technical solution introduced above is illustrated in combination with one example.

Assuming that the first terminal is UE_A that receives measurement information sent from UE_B, UE_C, and UE_D, the UE_A sends the target information on a time-frequency resource with a frame number of 100 and a sub-frame number of 2. The measurement information sent by the UE_B, UE_C, and UE_D all include the measurement values corresponding to the above positions, which are P_B, P_C, and P_D, respectively.

The UE_A performs statistical processing on the above three measurement values to obtain P_m and converts P_m into the corresponding SNR under the AWGN channel, which is assumed to be SNR_m.

Figure 5:
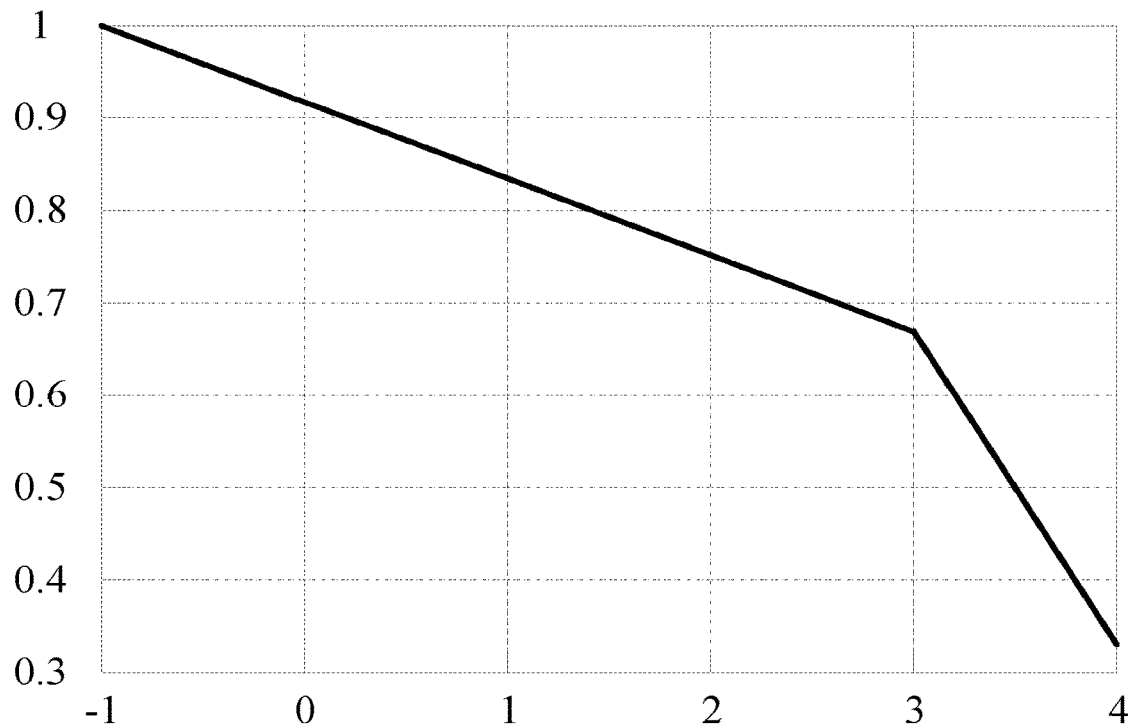
FIG. 5 exemplarily illustrates a schematic diagram of a CDF curve.

In a possible processing method, P_m=mean (P_B, P_C, P_D), that is, the P_m is an average value of P_B, P_C, and P_D:

In another possible processing method, the P_B, P_C and P_D are sorted in descending order, a CDF (Cumulative Distribution Function) curve is drawn and the corresponding abscissa value of the point that has an ordinate value of 0.9 is determined as P_m. Assuming that P_B=, P_C=4 and P_D=2, the P_B, P_C and P_D are sorted in descending order into 4, 2, and 0, the CDF curve is drawn as shown in FIG. 5, the P_m is determined as 0.2 since the position with an ordinate value of 0.9 corresponds to an abscissa value of 0.2.

Figure 6:
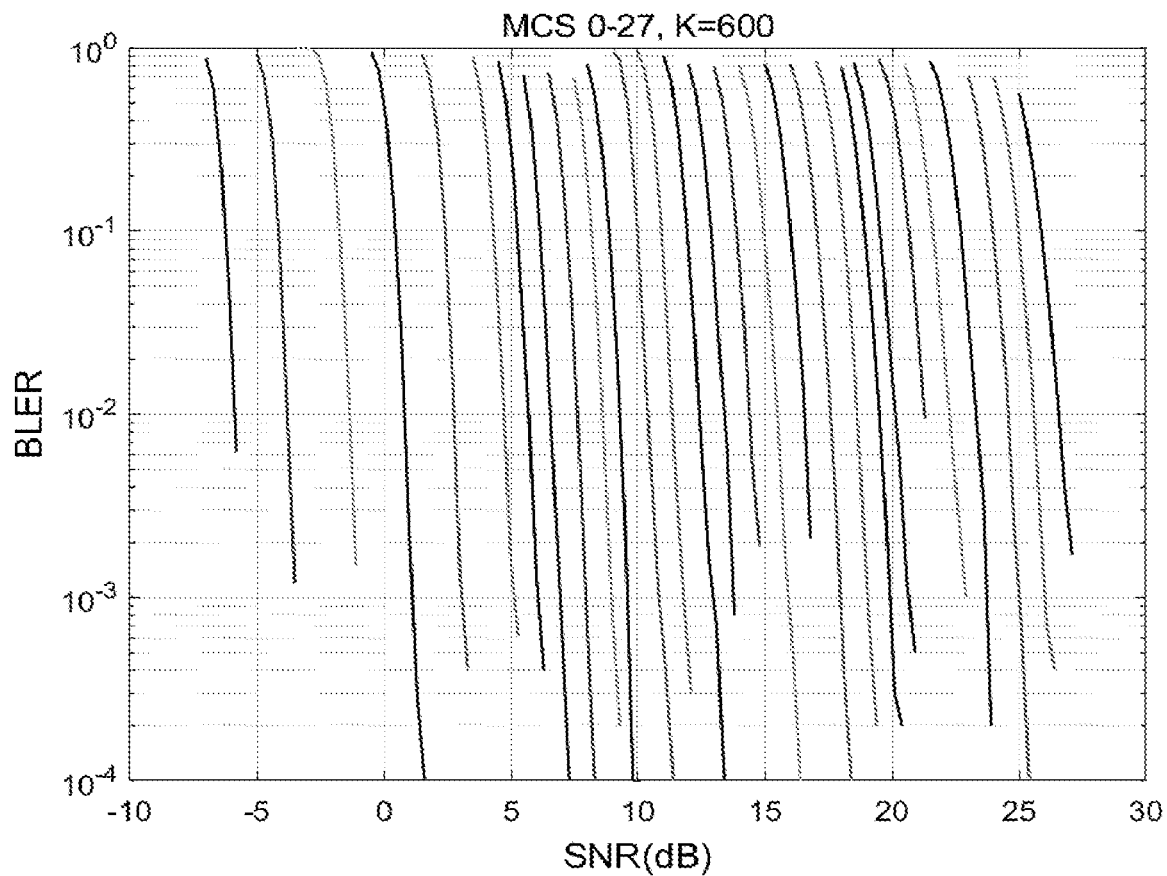
FIG. 6 exemplarily illustrates a schematic diagram of correspondence curves of SNR to BLER.

The UE_A looks up correspondence curves of SNR to BLER under different MCS levels, determines the maximum available MCS level obtained by the UE_A according to the channel quality and records it as $MCS_X$. Exemplarily, the pre-stored correspondence curve of SNR to BLER is shown in FIG. 6. Assuming that SNR_m obtained in the previous step is SNR_m=4 dB, when the BLER meets the requirement, the first 4 MCS levels meet the requirements in case that the requirement is defined as 0.1 according to the correspondence curve shown in FIG. 6, that is, $MCS_X$=3 (the numbering of MCS level starts from 0).

When the UE_A obtains the maximum MCS level $MCS_{max}$ and the minimum MCS level $MCS_{min}$ of the geographic area where it is currently located, assuming $MCS_{max}$=10 and $MCS_{min}$=0, the maximum available MCS level of the UE_A is 3 and the minimum available MCS level of the UE_A is 0.

According to a size of the data packet to be sent, the UE_A selects a TBS value closest to the size of the data packet to be sent within a range of the above available MCS level. Assuming that the size of the data packet to be sent is 300 bits, a lookup is performed in the following Table 2 within a range of MCS0 to MCS3, the TBS value is then determined to be 328 since the smallest TBS value greater than 300 bits is 328.

TABLE 2

| $I_{TBS}$ | 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 660 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 260 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |

TABLE 2-continued

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4006 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

Assuming that a candidate number of PRBs (physical resource blocks) includes 6, 8, and 9, the criteria for UE_A to select the number of PRBs for transmitting the above data packet to be sent may be as follows:

1. within the range of available MCS levels, the maximum number of PRBs that meet the TBS value is determined as available physical resources, that is, the number of PRBs is selected to be 9. In this way, the code rate may be reduced and the transmission reliability may be improved with a great extent; and 2. within the range of available MCS levels, the smallest number of PRBs that meet the TBS value is determined as available physical resources, that is, the number of PRBs is selected to be 6. In this way, the occupation of physical resources may be reduced and the network are allowed to accommodate more users.

Hereafter, taking a case as an example that the second terminal sends measurement information to the first terminal, the method for measuring information is introduced and explained. It should be noted that, only taking the case that the second terminal sends measurement information to the first terminal as an example in this embodiment, the cases that other terminals sending measurement information to the first terminal or the first terminal sends measurement information to other terminals may refer to the method provided in this embodiment.

In a possible implementation, the second terminal sends a message carrying measurement information to the first terminal through a PSCCH (Physical Sidelink Control Channel), wherein the PSCCH is configured to carry SCI (Sidelink Control Information).

Alternatively, the above message further includes a first indication information configured to indicate that the message carries measurement information. In addition, in case that the above message does not carry the measurement information, the above message may include a second indication information configured to indicate that the message does not carry measurement information. Alternatively, the above indication information configured to characterize whether the message carries measurement information may be represented by the bit 1. For example, the bit 1 is a first indication information indicating that measurement information is carried; the bit 0 is a second indication information indicating that no measurement information is carried.

In another possible implementation, the second terminal sends measurement information to the first terminal through a PSSCH (Physical Sidelink Shared Channel) which is configured to carry sidelink discovery messages of the terminal.

Alternatively, the measurement information occupies at least one RE in a first symbol of the PSSCH; or the measurement information occupies m REs in a first n symbols of the PSSCH, wherein n and m are both positive integers.

Of course, the above transmission of measurement information through the PSCCH or PSSCH is only exemplary and explanatory. In other embodiments, other channels may be used to transmit the measurement information. For example, the protocol pre-defines a dedicated channel for transmitting the measurement information. The measurement information is sent through the dedicated channel.

In addition, the second terminal may directly send the message carrying measurement information to the first terminal, or may forward the message carrying measurement information to the first terminal through other devices (such as access network devices or other terminals).

Alternatively, after receiving the target information sent by the first terminal, the second terminal may detect whether the first terminal has passed PSCCH activation detection; in case that the first terminal has passed the PSCCH activation detection, the second terminal obtains the measurement information corresponding to the target information and sends the above measurement information to the first terminal; in case that the first terminal failed to pass the PSCCH activation detection, the procedure may be ended. In the above manner, the measurement information is collected only for the terminals that have passed the PSCCH activation detection, which helps to save the processing overhead of the second terminal.

In addition, statistical granularity of the measurement information in the time domain includes any one of the following: at least one frame, at least one sub-frame, at least one slot, and at least one symbol. The statistical granularity may be pre-defined in the protocol or indicated by the network side device to the second terminal.

In summary, in the technical solution according to this embodiment, the second terminal sends measurement information to the first terminal, so that the first terminal may learn about the channel quality based on the measurement information, and then determine the MCS after evaluating the channel quality level, which avoids the problem that large-scale information loss is caused by the selected MCS level being too large when the channel quality is poor and helps improve the reliability of information transmission.

The apparatus embodiment of the present disclosure is as follows, which may be used to implement the method embodiment of the present disclosure. For the details that are not disclosed in the apparatus embodiment of the present disclosure, the method embodiment of the present disclosure may be referred.

Figure 7:
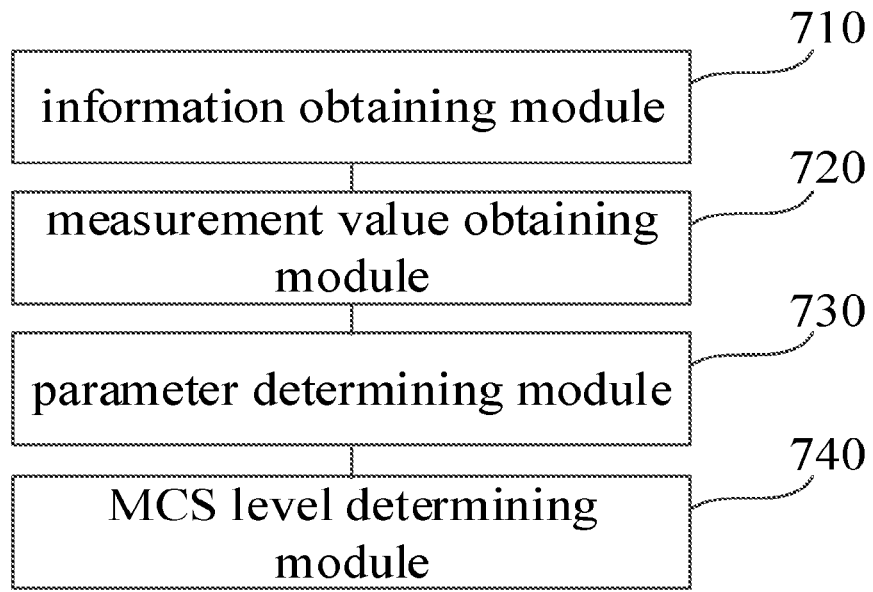
FIG. 7 is a block diagram illustrating an apparatus for determining an MCS level according to an example embodiment.

FIG. 7 is a block diagram illustrating an apparatus for determining an MCS level according to an example embodiment. The apparatus has the function of implementing the above method examples, and the function may be implemented in hardware, or in corresponding software executed by hardware. The apparatus may be applied to a terminal, such as the first terminal introduced above. The apparatus may include an information obtaining module 710, a measurement value obtaining module 720, a parameter determining module 730, and an MCS level determining module 740. Of course, it should be understood that one or more of the modules described herein can be implemented by hardware, such as circuitry.

The information obtaining module 710 is configured to obtain at least one piece of measurement information which includes a measurement position indicating a time-frequency position occupied by information sent via a direct communication interface for transmitting V2X businesses, and a measurement value indicating channel quality of a channel for transmitting the information.

The measurement value obtaining module 720 is configured to obtain a target measurement value corresponding to a target measurement position from the at least one piece of measurement information, wherein the target measurement position refers to a measurement position corresponding to target information sent by the first terminal.

The parameter determining module 730 is configured to determine a quality parameter of a target channel for transmitting the target information according to the target measurement value.

The MCS level determining module 740 is configured to determine a maximum available MCS level corresponding to the target channel according to the quality parameter of the target channel.

In conclusion, in the technical solutions according to the embodiments of the present disclosure, the first terminal obtains a target measurement value corresponding to a target measurement position from the measurement information, the target measurement position referring to a measurement position corresponding to target information sent by the first terminal; the first terminal determines a quality parameter of a target channel for transmitting the target information according to the target measurement value, and further determines a maximum available MCS level corresponding to the target channel according to the quality parameter of the target channel. It is achieved that an MCS level is determined after evaluating the channel quality, which avoids the problem that large-scale information loss is caused by the selected MCS level being too large when the channel quality is poor and helps improve the reliability of information transmission.

In an alternative embodiment based on the embodiment in FIG. 7, the parameter determining module 730 is configured to, when a target measurement value is obtained, determine the quality parameter of the target channel for transmitting the target information according to the target measurement value. Alternatively, when at least two target measurement values are obtained, the module 730 can determine an integrated measurement value according to the at least two target measurement values and determine the quality parameter of the target channel for transmitting the target information according to the integrated measurement value.

In an example, the parameter determining module 730 is specifically configured to determine a threshold value that meets a preset condition as the integrated measurement value according to the at least two target measurement values. The preset condition is that there are p % number of target measurement values greater than the threshold value and there are 1-p % number of target measurement values less than the threshold value, where p is a preset constant.

In another example, the parameter determining module 730 is specifically configured to calculate an average value of the at least two target measurement values, and determine the average value as the integrated measurement value.

In another alternative embodiment based on the embodiment of FIG. 7 or the above alternative embodiment, the information obtaining module 710 can be configured to receive a message sent by a second terminal, the message carrying the measurement information, and obtain the measurement information from the message.

In another alternative embodiment based on the embodiment in FIG. 7 or the above alternative embodiment, the apparatus can further include an MCS level adjusting module, configured to when a maximum MCS level and a minimum MCS level of a geographic area in which the first terminal is located are obtained, adjust the maximum available MCS level according to the maximum MCS level, the minimum MCS level and the maximum available MCS level.

Alternatively, the MCS level adjusting module can be configured to, when the maximum available MCS level before adjustment is greater than the minimum MCS level, determine the smaller value between the maximum available MCS level before adjustment and the maximum MCS level as the adjusted maximum available MCS level, and, when the maximum available MCS level before adjustment is less than or equal to the minimum MC'S level, determine the minimum MCS level as the adjusted maximum available MCS level.

In another alternative embodiment based on the embodiment of FIG. 7 or the above alternative embodiment, the apparatus further includes: a TBS value selecting module and a carrier determining module.

The TBS value selecting module is configured to select a TBS value closest to the data amount of the information to be sent within a range of the maximum available MCS level according to the data amount of the information to be sent on the target channel.

The carrier determining module is configured to determine a number of physical carriers for transmitting the information to be sent according to the TBS value.

Alternatively, the carrier determining module is configured to select the largest number of physical carriers from at least two candidate numbers of physical carriers as the number of physical carriers for transmitting the information to be sent, or elect the smallest number of physical carriers from at least two candidate numbers of physical carriers as the number of physical carriers for transmitting the information to be sent.

In another alternative embodiment based on the embodiment of FIG. 7 or the above alternative embodiment, the quality parameter is an SNR, or the quality parameter is an SINR.

It should be noted that, when the apparatus according to the above embodiment implements its functions, only the division of the above functional modules is used as an example. In actual applications, the above functions may be allocated by different functional modules according to actual needs. That is, the content structure of the apparatus is divided into different functional modules to complete all or part of the functions described above.

Regarding the apparatus in the above embodiment, the specific manner in which each module performs operations has been described in detail in the method embodiment, which will not be described in details here.

An example embodiment of the present disclosure also provides a terminal, which may implement the method for determining the MCS level according to the present disclosure. The terminal includes a processor and a memory for storing instructions executable by the processor, wherein the processor is configured to obtain at least one piece of measurement information which includes a measurement position indicating a time-frequency position occupied by information sent via a direct communication interface for transmitting V2X businesses, and a measurement value indicating channel quality of a channel for transmitting the information, and obtain a target measurement value corresponding to a target measurement position from the at least one piece of measurement information, wherein the target measurement position refers to a measurement position corresponding to target information sent by the first terminal. The processor can further be configured to determine a quality parameter of a target channel for transmitting the target information according to the target measurement value, and determine a maximum available MCS level corresponding to the target channel according to the quality parameter of the target channel.

Alternatively, the processor is configured to, when a target measurement value is obtained, determine the quality parameter of the target channel for transmitting the target information according to the target measurement value, or when at least two target measurement values are obtained, determine an integrated measurement value according to the at least two target measurement values; and determine the quality parameter of the target channel for transmitting the target information according to the integrated measurement value.

Alternatively, the processor is configured to determine a threshold value that meets a preset condition as the integrated measurement value according to the at least two target measurement values. The preset condition is that there are p % number of target measurement values greater than the threshold value and there are 1-p % number of target measurement values less than the threshold value, where p is a preset constant.

Alternatively, the processor is configured to calculate an average value of the at least two target measurement values, and determine the average value as the integrated measurement value.

Alternatively, the processor is configured to receive a message sent by a second terminal, the message carrying the measurement information, and obtain the measurement information from the message.

Alternatively, the processor is further configured to, when a maximum MCS level and a minimum MCS level of a geographic area in which the first terminal is located are obtained, adjust the maximum available MCS level according to the maximum MCS level, the minimum MCS level and the maximum available MCS level.

Alternatively, the processor is configured to, when the maximum available MCS level before adjustment is greater than the minimum MCS level, determine the smaller value between the maximum available MCS level before adjustment and the maximum MCS level as the adjusted maximum available MCS level, and when the maximum available MCS level before adjustment is less than or equal to the minimum MCS level, determine the minimum MCS level as the adjusted maximum available MCS level.

Alternatively, the processor is further configured to select a TBS value closest to the data amount of the information to be sent within a range of the maximum available MCS level according to the data amount of the information to be sent on the target channel, and determine a number of physical carriers for transmitting the information to be sent according to the TBS value.

Alternatively, the processor is configured to select the largest number of physical carriers from at least two candidate numbers of physical carriers as the number of physical carriers for transmitting the information to be sent, or select the smallest number of physical carriers from at least two candidate numbers of physical carriers as the number of physical carriers for transmitting the information to be sent.

Alternatively, the quality parameter is an SNR, or the quality parameter is an SINR.

The solutions according to the embodiments of the present disclosure are introduced above mainly from the perspective of the terminal. It may be understood that in order to implement the above functions, the terminal includes hardware structures and/or software modules corresponding to each function. In combination with the units and algorithm steps of the examples described in the embodiments disclosed in the present disclosure, the embodiments of the present disclosure may be implemented in hardware or in a combination of hardware and computer software. Whether a certain function is executed in hardware or in computer software-driven hardware depends on the specific application and design constraints of the technical solution. Those skilled in the art may apply different methods for each specific application to implement the described functions, but such implementation should not be considered as going beyond the scope of the technical solutions of the embodiments of the present disclosure.

Figure 8:
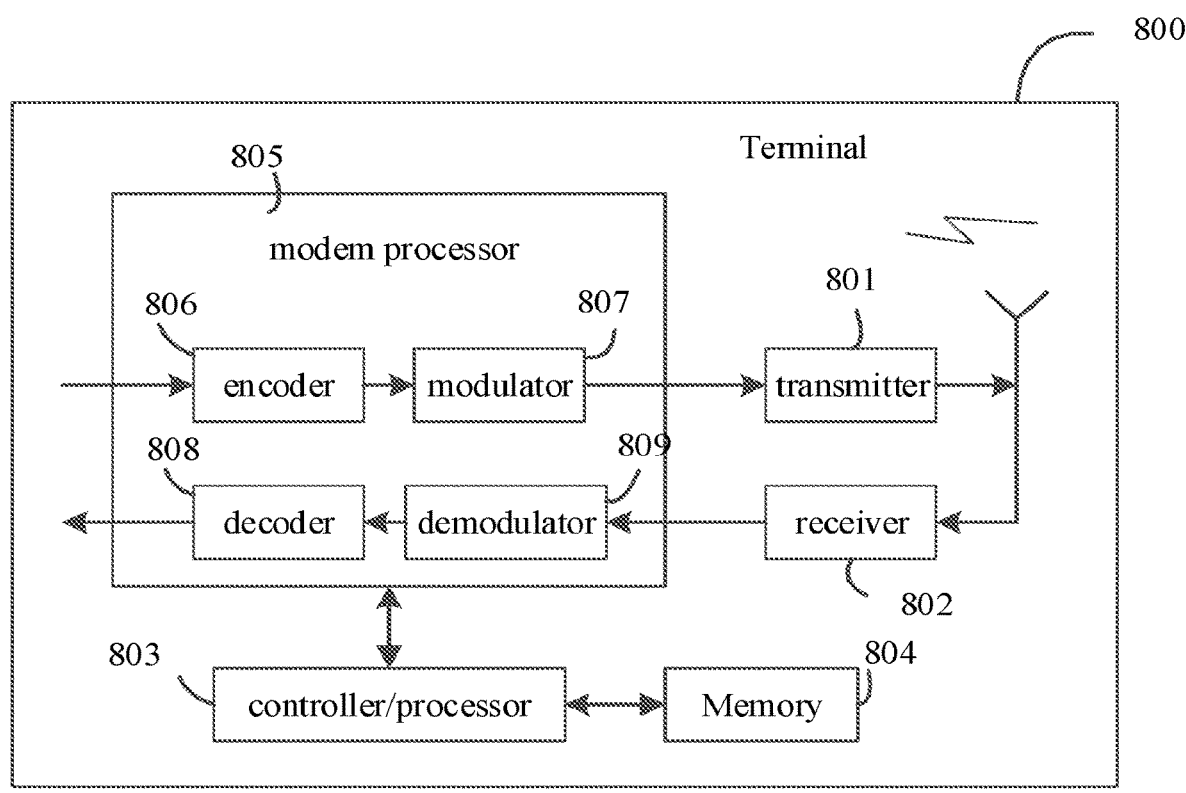
FIG. 8 is a structural schematic diagram of a terminal according to an example embodiment.

FIG. 8 is a structural schematic diagram of a terminal according to an example embodiment. The terminal 800 includes a transmitter 801, a receiver 802 and a processor 803. The processor 803 herein may also be a controller, which is represented as "controller/processor 803" in FIG. 8. Alternatively, the terminal 800 may further include a modem processor 805, where the modem processor 805 may include an encoder 806, a modulator 807, a decoder 808, and a demodulator 809.

In one example, the transmitter 801 adjusts (e.g., analog converts, filters, amplifies, and up-converts, and the like) output samples and generates an uplink signal, which is transmitted to the access network device via an antenna. On the downlink, the antenna receives the downlink signal transmitted from the access network device. The receiver 802 adjusts (e.g., filters, amplifies, down-converts, and digitizes, and the like) the signal received from the antenna and provides input samples. In the modem processor 805, the encoder 806 receives business data and signaling messages to be transmitted on the uplink, and processes (e.g., formats, encodes, and interleaves) business data and signaling messages. The modulator 807 further processes (e.g., performs symbol mapping and modulates) the business data and signaling messages and provides the output samples. The demodulator 809 processes (e.g., demodulates) the input samples and provides symbol estimates. The decoder 808 processes (e.g., de-interleaves and decodes) the symbol estimates and provides the decoded data and signaling messages sent to the terminal 800. The encoder 806, the modulator 807, the demodulator 809, and the decoder 808 may be implemented by a synthesized modem processor 805. These units are processed according to wireless access technology adopted by the wireless access network (e.g., the access technology of LTE and other evolved systems). It should be noted that when the terminal 800 does not include the modem processor 805, the above functions of the modem processor 805 may also be performed by the processor 803.

The processor 803 controls and manages the actions of the terminal 800, and is configured to execute the processing procedures performed by the terminal 800 in the above embodiments of the present disclosure. For example, the processor 803 is further configured to execute various steps on the terminal side (including the first terminal or the second terminal) in the above method embodiments, and/or other steps of the technical solutions described in the embodiments of the present disclosure.

Further, the terminal 800 may further include a memory 804 which is configured to store program codes and data for the terminal 800.

The processor configured to perform the functions of the above terminal in the embodiments of the present disclosure may be a central processing unit (CPU), a general-purpose processor, a digital signal processor (DSP), and an application-specific integrated circuit (ASIC), field programmable gate arrays (FPGA) or other programmable logic devices, transistor logic devices, hardware components, or any combination thereof. Various exemplary logical blocks, modules and circuits described in conjunction with the disclosure of the embodiments of the present disclosure may be implemented or executed. The processor may also be a combination of computing functions, for example, a combination of one or more microprocessors, a combination of a DSP and a microprocessor, and so on.

The steps of methods or algorithms described in conjunction with the disclosed content of the embodiments of the present disclosure may be implemented in hardware, or may be implemented in a manner that a processor executes software instructions. Software instructions may be composed of corresponding software modules, which may be stored in a random access memory (RAM), a flash memory, a read-only memory (ROM), and an erasable programmable read-only memory (EPROM), an Electrically Erasable Programmable Read-Only Memory (EEPROM), a register, a hard disk, a mobile hard disk, a CD-ROM or any other form of storage medium known in the art. An exemplary storage medium is coupled to the processor, so that the processor may read information from the storage medium and may write information to the storage medium. Of course, the storage medium may also be an integral part of the processor. The processor and the storage medium may be located in the ASIC. In addition, the ASIC may be located in the terminal. Of course, the processor and the storage medium may also exist in the terminal as discrete components.

Those skilled in the art should be recognized that, in one or more of the above examples, the functions described in the embodiments of the present disclosure may be implemented in hardware, software, firmware, or any combination thereof. When implemented in software, these functions may be stored in a computer-readable medium or transmitted as one or more instructions or codes on the computer-readable medium. Computer-readable media include computer storage media and communication media, where communication media includes any media that facilitates the transferring of computer programs from one place to another. The storage medium may be any available medium that may be accessed by a general-purpose or special-purpose computer.

The embodiments of the present disclosure also provide a non-transitory computer-readable storage medium on which a computer program is stored, when the computer program is executed by a processor, the steps of the method for determining the MCS level described above are implemented.

It should be understood that the "plurality" mentioned herein refers to two or more. "And/or" describes the association relationship of the associated objects, indicating that there may be three relationships, for example, A and/or B, which may be represented by: A alone exists, A and B exist at the same time, and B exists alone. The character "/" generally indicates that the associated objects are in an "or" relationship.

Those skilled in the art will easily recognize other embodiments of the present disclosure after considering the description and practicing the invention disclosed herein. The present application is intended to cover any variations, usages, or adaptive changes of the present disclosure. These variations, usages, or adaptive changes follow the general principles of the present disclosure and include common knowledge or conventional technical means in the technical field not disclosed in the present disclosure. The description and the embodiments are only regarded as exemplary, and the true scope and spirit of the present disclosure are referred to the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for determining a Modulation and Coding Scheme (MCS) level, comprising:
    obtaining by a first terminal, at least one piece of measurement information which includes a measurement position indicating a time-frequency position occupied by information sent via a direct communication interface for transmitting V2X businesses of the Internet of Vehicles, and a measurement value indicating channel quality of a channel for transmitting the information;
    obtaining by the first terminal, a target measurement value corresponding to a target measurement position from the at least one piece of measurement information, wherein the target measurement position is a measurement position corresponding to target information sent by the first terminal;
    determining by the first terminal, a quality parameter of a target channel for transmitting the target information based on the target measurement value; and
    determining by the first terminal, a maximum available MCS level corresponding to the target channel based on the quality parameter of the target channel.

2. The method of claim 1, wherein determining the quality parameter of the target channel for transmitting the target information based on the target measurement value comprises at least one of:
    determining the quality parameter of the target channel for transmitting the target information based on the target measurement value when the target measurement value is obtained by the first terminal;
    and
    determining an integrated measurement value based on at least two target measurement values and determining the quality parameter of the target channel for transmitting the target information based on the integrated measurement value when the at least two target measurement values are obtained by the first terminal.

3. The method of claim 2, wherein determining the integrated measurement value based on the at least two target measurement values comprises:
    determining a threshold value that meets a preset condition as the integrated measurement value based on the at least two target measurement values,
    wherein the preset condition is that there are p % number of target measurement values greater than the threshold value and there are 1-p % number of target measurement values less than the threshold value, where p is a preset constant.

4. The method of claim 2, wherein determining the integrated measurement value based on the at least two target measurement values, comprises:
    calculating an average value of the at least two target measurement values; and determining the average value as the integrated measurement value.

5. The method of claim 1, wherein obtaining the at least one piece of measurement information comprises:
    receiving a message sent by a second terminal, the message carrying the measurement information; and obtaining the measurement information from the message.

6. The method of claim 1, comprising:
adjusting a maximum available MCS level based on a maximum MCS level, a minimum MCS level, and the maximum available MCS level when the maximum MCS level and the minimum MCS level of a geographic area in which the first terminal is located are obtained by the first terminal.

7. The method of claim 6, wherein adjusting the maximum available MCS level based on the maximum MCS level, the minimum MCS level, and the maximum available MCS level comprises:
determining the smaller between the maximum available MCS level before adjustment and the maximum MCS level as the adjusted maximum available MCS level when the maximum available MCS level before adjustment is greater than the minimum MCS level; or
determining the minimum MCS level as the adjusted maximum available MCS level when the maximum available MCS level before adjustment is less than or equal to the minimum MCS level.

8. The method of claim 1, comprising:
selecting a transport block size (TBS) value closest to data volume of the information to be sent within a range of the maximum available MCS level, based on the data volume of the information to be sent on the target channel; and
determining a number of physical carriers for transmitting the information to be sent according to the TBS value.

9. The method of claim 8, wherein determining the number of physical carriers for transmitting the information to be sent based on the TBS value comprises at least one of:
selecting the largest number of physical carriers from at least two candidate numbers of physical carriers as the number of physical carriers for transmitting the information to be sent;
and
selecting the smallest number of physical carriers from at least two candidate numbers of physical carriers as the number of physical carriers for transmitting the information to be sent.

10. The method of claim 1, wherein the quality parameter is a signal-to-noise ratio (SNR) or a signal-to-interference plus noise ratio (SINR).

11. An apparatus for determining a Modulation and Coding Scheme (MCS) level that is applied to a first terminal, the apparatus comprising:
one or more processors;
a memory storing instructions executable by the one or more processors;
wherein the one or more processors are configured to:
obtain at least one piece of measurement information which includes a measurement position indicating a time-frequency position occupied by information sent via a direct communication interface for transmitting V2X businesses of the Internet of Vehicles, and a measurement value indicating channel quality of a channel for transmitting the information;
obtain a target measurement value corresponding to a target measurement position from the at least one piece of measurement information, wherein the target measurement position is a measurement position corresponding to target information sent by the first terminal;
determine a quality parameter of a target channel for transmitting the target information based on the target measurement value; and
determine a maximum available MCS level corresponding to the target channel based on the quality parameter of the target channel.

12. The apparatus of claim 11, wherein the one or more processors are configured to perform at least one act of:
determining the quality parameter of the target channel for transmitting the target information based on the target measurement value when the target measurement value is obtained;
and
determining an integrated measurement value based on at least two target measurement values and determining the quality parameter of the target channel for transmitting the target information based on the integrated measurement value when the at least two target measurement values are obtained.

13. The apparatus of claim 12, wherein the one or more processors are configured to:
determine a threshold value that meets a preset condition as the integrated measurement value based on the at least two target measurement values,
wherein the preset condition is that there are p % number of target measurement values greater than the threshold value and there are 1-p % number of target measurement values less than the threshold value, where p is a preset constant.

14. The apparatus of claim 12, wherein the one or more processors are configured to:
calculate an average value of the at least two target measurement values, and determine the average value as the integrated measurement value.

15. The apparatus of claim 11, wherein the one or more processors a configured to;
receive a message sent by a second terminal, the message carrying the measurement information; and
obtain the measurement information from the message.

16. The apparatus of claim 11, wherein the one or more processors are configured to:
adjust the maximum available MCS level according to a maximum MCS level, a minimum MCS level, and the maximum available MCS level when the maximum MCS level and the minimum MCS level of a geographic area in which the first terminal is located are obtained.

17. The apparatus of claim 16, wherein the one or more processors are configured to:
determine the smaller value between the maximum available MCS level before adjustment and the maximum MCS level as the adjusted maximum available MCS level when the maximum available MCS level before adjustment is greater than the minimum MCS level; and
determine the minimum MCS level as the adjusted maximum available MCS level when the maximum available MCS level before adjustment is less than or equal to the minimum MCS level.

18. The apparatus of claim 11, wherein the one or more processors are configured to:
select a TBS value closest to the data amount of the information to be sent within a range of the maximum available MCS level based on the data amount of the information to be sent on the target channel; and
determine a number of physical carriers for transmitting the information to be sent according to the TBS value.

19. The apparatus of claim 18, wherein the one or more processors are configured to preform at least one act of:
  selecting the largest number of physical carriers from at least two candidate numbers of physical carriers as the number of physical carriers for transmitting the information to be sent;
  and
  selecting the smallest number of physical carriers from at least two candidate numbers of physical carriers as the number of physical carriers for transmitting the information to be sent.

20. A non-transitory computer-readable storage medium having a computer program stored thereon that, when the program is executed by a processor, causes the processor to implement a method for determining a Modulation and Coding Scheme (MCS) level, and the method comprising:
  obtaining by a first terminal, at least one piece of measurement information which includes a measurement position indicating a time-frequency position occupied by information sent via a direct communication interface for transmitting V2X businesses of the Internet of Vehicles, and a measurement value indicating channel quality of a channel for transmitting the information;
  obtaining by the first terminal, a target measurement value corresponding to a target measurement position from the at least one piece of measurement information, wherein the target measurement position is a measurement position corresponding to target information sent by the first terminal;
  determining by the first terminal, a quality parameter of a target channel for transmitting the target information based on the target measurement value; and
  determining by the first terminal, a maximum available MCS level corresponding to the target channel based on the quality parameter of the target channel.

* * * * *